E. J. SWEETLAND.
FILER.
APPLICATION FILED MAY 9, 1914.
1,240,385.
Patented Sept. 18, 1917.
2 SHEETS—SHEET 2.
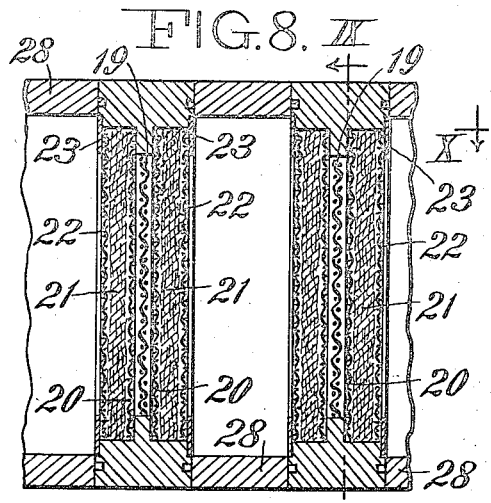
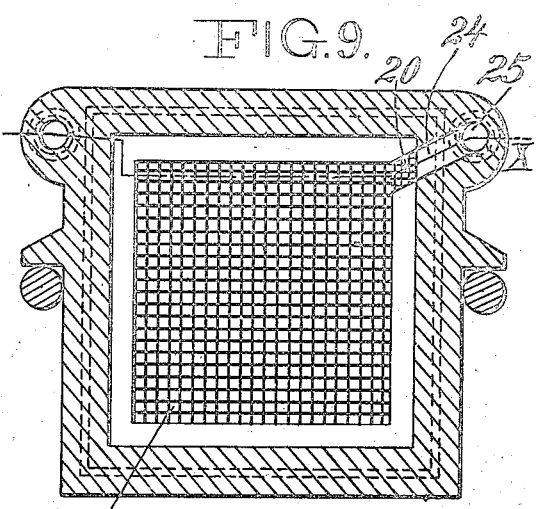
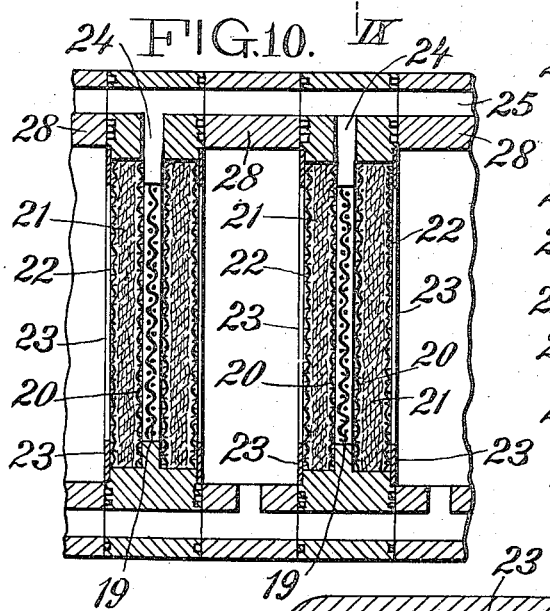
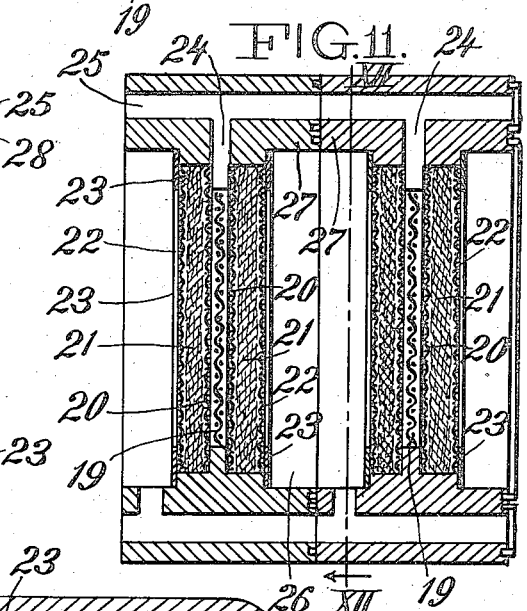
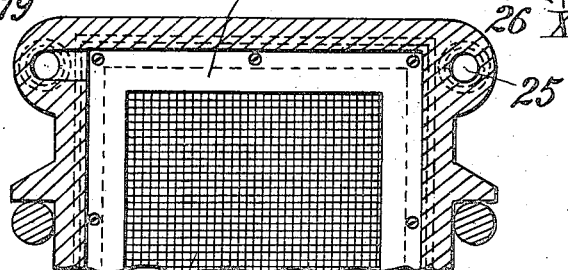
WITNESSES:
Oliver Williams
J. Hilary Bouillon
INVENTOR
Ernest J. Sweetland
BY
Gerald E. Terwilliger ATTORNEY

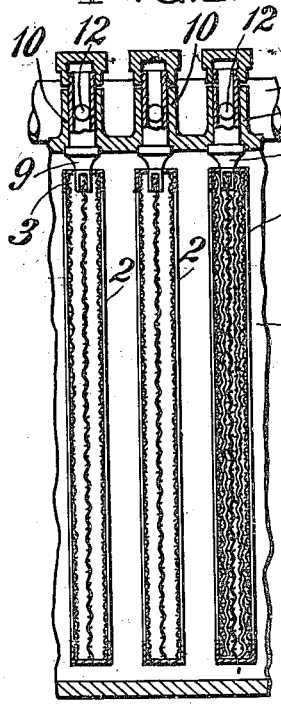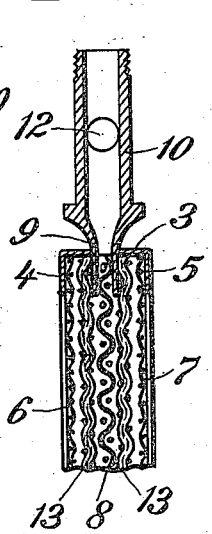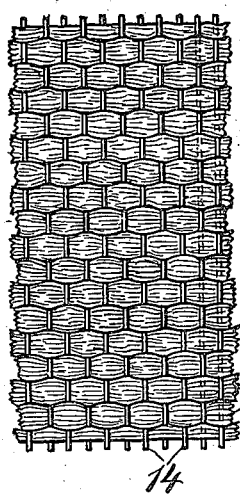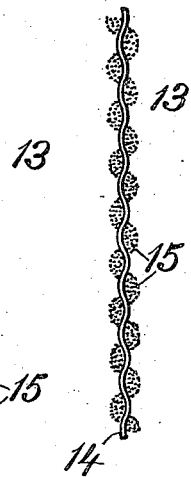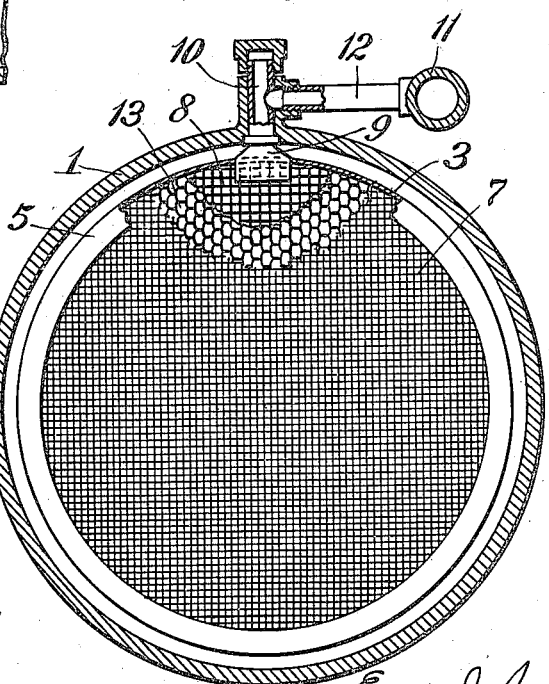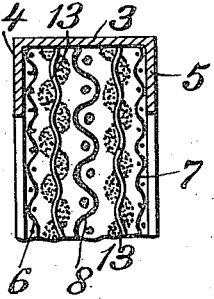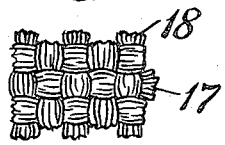

UNITED STATES PATENT OFFICE.

ERNEST J. SWEETLAND, OF MONTCLAIR, NEW JERSEY.

FILTER.

1,240,385.                    Specification of Letters Patent.     Patented Sept. 18, 1917.

Application filed May 9, 1914. Serial No. 837,379.

*To all whom it may concern:*

Be it known that I, ERNEST J. SWEETLAND, a citizen of the United States, residing in the town of Montclair, county of Essex, and State of New Jersey, have invented certain new and useful Improvements in Filters, of which the following is a specification.

My invention relates to a filter medium composed of metallic fibers aggregated into sheets. Hitherto the filter medium most used has been of cloth and for many purposes this is entirely satisfactory. However, when the substance to be filtered contains an agent which is destructive of cloth, such for instance as strong alkalis, the cloth filter medium is rapidly destroyed and its replacement not only represents a considerable waste in time during which the filter is thrown out of service, but also entails a large financial expenditure. The object of my invention is to provide a filter medium which may be used to replace cloth as a filter medium, and which will be composed of a material which is preserved rather than attacked by the alkali or other destructive agent present in the liquid to be filtered.

In my improved filter structure I provide a filter medium which is composed of matted metallic filaments. These filaments when composed of steel or lead are known in the trade as "steel wool" or "lead wool." There are many ways in which they may be aggregated to form a suitable filtering medium, and certain preferred structures will be described in detail below. I am aware that in the filtration of acid solutions "glass wool" and so-called "mineral wool," formed of slag, have heretofore been utilized, but neither of these substances is adaptable to the purpose of my invention, lacking many of the advantages which are inherent in a metallic structure. I am also aware that the use of fine wire netting or screen has been proposed, but it will be obvious that this material neither filters in the same manner as that of the present invention, nor does it possess the manifold advantages attached to my improved filter medium.

In the accompanying drawings which form a part of this specification, Figure 1 is a vertical sectional view of a portion of a leaf-filter showing three of the filter-leaves; Fig. 2 is a transverse sectional view on a vertical plane at right angles to that of Fig. 1, parts being broken away to show the internal construction of the leaf; Fig. 3 is an enlarged detail fragmentary sectional view through a portion of a leaf; Fig. 4 is an elevation of one type of fabric adapted to be used as the filter medium; Fig. 5 is a sectional view of this medium; Fig. 6 is an enlarged sectional view of a portion of a filter-leaf taken on a plane at right angles to that of Fig. 3; Fig. 7 is a view similar to Fig. 6 but illustrating a modification; Fig. 8 is a vertical sectional view of a plate and frame filter; Fig. 9 is a sectional view on line IX—IX of Fig. 8; Fig. 10 is a sectional view on line X—X of Fig. 9; Fig. 11 is a sectional view similar to Fig. 8 but showing a modified form of filter; Fig. 12 is a sectional view on line XII—XII of Fig. 11; Fig. 13 is a view similar to Fig. 4 showing a modified type of fabric; and Fig. 14 is a sectional view of this fabric.

Referring to the drawings in detail, the numeral 1 designates the shell of a filter in which is mounted a plurality of filter-leaves 2. Each leaf comprises an outer hoop of channel section having the flanges or legs 4 and 5 projecting radially inward. Adjacent to the flange 4 and retained in place thereby is a circular disk 6 of wire screen. Adjacent to the flange 5 and retained in place thereby is a similar circular disk 7. Centrally mounted between the flanges of the channel is a circular disk 8 of coarse screen, a portion of which enters between the depending walls 9 of the outlet nipple 10, which is suspended from the shell as shown in Fig. 1 and which communicates with the outlet manifold 11 through the pipe 12.

Between the disks 6 and 8, and also between the disks 7 and 8, is mounted a layer of filter medium 13. This filter medium may comprise a woven fabric, one set of threads of which is composed of wires 14, and the other threads of which are formed of strands 15 of aggregated metallic filaments such as "steel wool" or "lead wool" of commerce. These strands, as clearly indicated in Figs. 4 and 5, consist of aggregated filaments arranged in the same general direction but overlapping one another, and owing to their inherent nature being irregular in their arrangement, so as to force the filtrate to take a devious course in passing through the fabric. Such a filter as I have described, particularly when formed of "steel wool", is not affected by alkaline solutions such as caustic soda or potash, but is preserved thereby. Furthermore, this fabric possesses a considerable degree of "life" or resilience, and when, after considerable use, it may have become clogged with the matter filtered out by it, it may be removed from the filter and subjected to a beating, which will free the included foreign matter and at the same time result in no disadvantageous effect upon the fabric because of this property.

The filter fabric requires this treatment only at intervals of several weeks in the case of average filtration conditions. In normal operation the cake forming on the filter medium is removed by the process which is known as "reversing the flow". This is accomplished by forcing clear water under pressure into the outlet manifold, and cutting off the inlet of material to be filtered. The clear water passes through the outlet manifold 11 through the pipe 12 and nipple 10 into the space between the disks 13 and then seeps through these disks, exerting pressure upon the cake formed on the outside of the filter leaf. This pressure dislodges the cake, causing it to fall by gravity into the bottom of the shell, whence it may be removed in any convenient manner. Consequently only a small proportion of the solid removed from the filtrate reaches the interior of the filter medium in such a way as to be so intimately associated therewith that the reversal of flow will not remove it. With my improved filter medium this, too, may be readily dislodged by whipping or beating and the filter medium thereby restored to its original state.

Another important advantage of my improved filter medium lies in the fact that in reversing the flow, as above described, the pressure of the clear water is exerted very evenly over the entire area of the cake which it is desired to dislodge, which results in the removal of the entire cake. With some other filter fabrics, such as the fine wire screen sometimes employed, the weakest part of the cake breaks away first, and the screen itself presents so little opposition to the passage of the clear water, that this water rushes through the aperture thus formed in the cake, and the pressure is so dissipated that the remainder of the cake is not dislodged. Of course steam or air under pressure may be used in place of water.

In the construction of the fabric, I find it most convenient to use the strands of metallic wool as the weft threads and the wires as the warp, although in some cases this order may be reversed. After this filter fabric has been woven, I find it extremely advantageous to pass it through powerful rolls which will flatten the outstanding filaments and mold the entire fabric into one closely matted whole, as indicated in Figs. 4 and 5.

In some instances I find it possible to do away with the outer retaining screens 6 and 7.

The filter which has already been described is similar in its general construction, with the exception of the specific filter medium, to the type of filter shown and described in detail in my Patent No. 1,083,305, dated January 6, 1914. The course of the filtrate, as will be obvious, will be through the screens 6 and 7, thence passing through the filter medium 13. The clear filtrate then enters the space between the disks 13 and passes up through the interstices of the coarse spacing screen 8 into the nipple 10, and thence into the outlet manifold.

Fig. 7 illustrates a modification in which the fabric 13 is supplanted by a mat 16 of the metallic wool or similar substance heretofore described. In this case the wool is aggregated into sheets and preferably rolled to a substantially uniform thickness, and occupies the same position in the filter-leaf as the fabric 13 in the structure above described. Furthermore, in some cases it may be desirable to form both the warp and the weft of the metallic filaments or metallic wool shown in Figs. 13 and 14, in which the numeral 17 designates the warp and the numeral 18 the weft. Such a structure may be used to replace the filter medium 13 in the manner above described.

In Figs. 8, 9 and 10 I have illustrated the use of aggregated or matted metallic wool in connection with a plate and frame filter of a well-known type, which need not be described in detail. Each of the filter members in this case is composed of a coarse central screen 19, on each side of which is a finer screen 20. Next to these screens 20 is a layer 21 of the fabric described in connection with Fig. 7, which is retained in place by the outer screens 22, which in turn are supported by the rectangular retaining plates 23 secured to the body of the filter. A passage 24 leads from the space between the layers of filtering material 21 to the outlet manifold 25.

In Figs. 11 and 12 I have illustrated a further modification showing another well-known type of filter, in which the spaces 26, into which the material to be filtered passes, are formed by the shoulders 27 extending from the filter plates and taking the place of the spacing members 28 in the filter of Figs. 8, 9 and 10. The construction of the filter members in this case is otherwise identical with that already described.

While I have illustrated only certain specific embodiments of my invention, I realize that it is susceptible of wide application and I do not desire to be limited to the precise constructions nor to the specific materials set forth.

Having thus described my invention, I claim:

1. A filter medium comprising a woven sheet having incorporated therein metallic fibers, said fibers individually extending across only a part of said sheet.

2. A filter medium comprising a woven sheet including a metallic wool.

3. A filter medium comprising a woven sheet including steel wool.

4. A filter medium comprising a woven sheet, one set of threads of which consists of metallic wool.

5. A filter medium comprising a woven sheet, one set of threads of which consists of steel wool.

6. A filter medium comprising a woven sheet, one ply of which consists of aggregated metallic filaments.

7. A filter medium comprising a woven sheet, one ply of which consists of matted aggregated metallic filaments.

8. A filter medium comprising a woven sheet, one set of threads of which consists of matted aggregated metallic filaments, and the other set of which consists of metal strands.

9. A filter member including a central spacing member, a layer of metallic wool on either side thereof and a foraminous retaining member for holding each of said layers in place.

10. A filter member including a drainage member, a layer of metallic wool thereover and a foraminous member for retaining said layer in place.

ERNEST J. SWEETLAND.

Witnesses:
GERALD E. TERWILLIGER,
KARL S. DEITZ.